Mar. 20, 1923.
R. BRANDTS.
WIND SCREEN FOR MOTOR CARS AND THE LIKE.
FILED NOV. 16, 1921.
1,448,785.
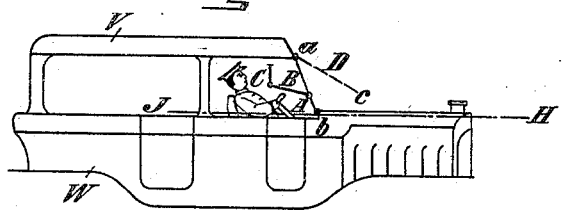
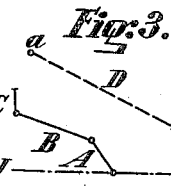
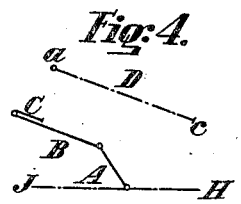
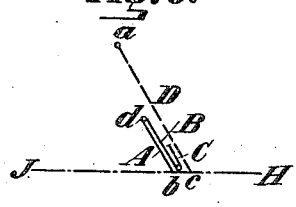
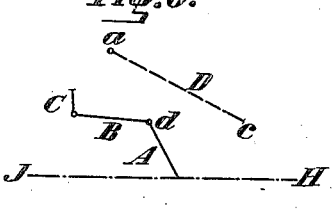
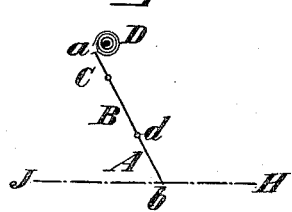
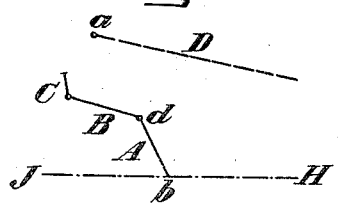
INVENTOR
Richard Brandts
By
his ATTORNEY.

Patented Mar. 20, 1923.

1,448,785

UNITED STATES PATENT OFFICE.

RICHARD BRANDTS, OF CHARLOTTENBURG, NEAR BERLIN, GERMANY.

WIND SCREEN FOR MOTOR CARS AND THE LIKE.

Application filed November 16, 1921. Serial No. 515,474.

*To all whom it may concern:*

Be it known that I, RICHARD BRANDTS, citizen of the German Republic, residing at Charlottenburg, near Berlin, Germany, have invented certain new and useful Improvements in Wind Screens for Motor Cars and the like, of which the following is a specification.

This invention relates to wind screens for motor cars and the like. It is well known that the ordinary glass screens of motor cars are obscured by rain or snow, as the drops of rain run along the glass and the snow deposits on them. The object of the invention is to provide a protective glass screen which is of such small dimensions and which is disposed so far away from the front of the car and so near the eyes of the driver that the rain or snow does not reach it, as a rule. Should, however, in encountering strong wind rain, snow or dust reach the glass screen, the latter can owing to its size and position easily be cleaned during the ride. As the glass screen is disposed close to the face of the driver it can be made very small without confining the field of vision. In the accompanying drawings various modifications of the invention are shown by way of example.

Fig. 1 shows the improvement applied to a motor car,

Figs. 2, 3 and 4 show one construction in various positions,

Figs. 5 and 6 another modification in two positions and

Figs. 7 and 8 a third modification.

The same letters of reference indicate similar parts throughout the figures of the drawing.

Referring to Fig. 1, W is the body of the car upon which the roof or hood V is arranged in the usual manner. At *a* is hinged to the roof or hood of the ordinary car the protective glass screen D. According to this invention a further screen consisting of three sections A, B, C is attached to a pair of stay-rods *a*, *b*, which connect the roof or hood with the body of the car. The entire screen of three sections can be moved downwards and be opened or closed around the two hinges connecting the three sections. The upper section C of the screen is made of glass or other transparent material, while the lower two sections can be made of any other suitable material.

If the front of the car is to be entirely closed towards the front, the screen D is lowered into the position shown in Fig. 2 and the screen A, B, C is moved downwards below the upper edge J H of the car. The driver then looks over the upper edge of the section C through the screen D unhindered by the second screen. If the protective screen is to be used in rain or snow, the screen D is swung around its hinge *a* into the position shown in Fig. 3, the screen A, B, C is drawn upwards and bent at the two joints in the manner shown. The driver can then look through the glass C past the lower edge *c* of the screen D and has an unobstructed view of the road. The glass C may then be turned downwards or in any other position around its joint with the section B in order to clean its outer face. Owing to the fact that the window C is situated close to the face of the driver, it needs only be comparatively small. Its dimensions depend upon the construction of the motor car as does the size of the screen D. If the wind screen is to be entirely opened in fine weather, the screen D is turned still further upwards and the glass C is folded out of the way, for instance against the section B, Fig. 4.

In the modification illustrated in Figs. 5 and 6, the screen A, B, C cannot be lowered, but the section B can be folded around the hinge *d* towards the outside and then rests upon the section A, while the section C is folded inwards and rests upon the section B. The driver then looks through the upper portion of the glass screen D above the hinge *d*, through a single pane of glass, see position Fig. 5. If in rainy weather the inner screen is taken into use, the outer screen D is swung upwards and the section B of the inner screen is turned inwards so that the section C can then be brought close to the eyes of the driver, who then looks through the glass C past the lower edge of the screen D, which latter prevents the rain or snow coming in contact with the glass C, see Fig. 6.

In the modification illustrated in Figs. 7 and 8 the glass screen is replaced by a roller apron D serving as rain cover. The screen A, B, C then forms the only protection against the wind and in fine weather is used in the manner shown in Fig. 7. In this case the section B and preferably also the section A is made of glass or the like. The apron D is rolled up upon a rod disposed at

*a*. In rainy weather the sections B and C of the screen are drawn inwards and the section C is adjusted at a proper angle in front of the eyes of the driver. The waterproof apron D is then unrolled and secured in a suitably inclined position, by means of connecting rods not shown in the drawing, or in any other suitable manner, so that the driver obtains an unobstructed view of the road through the glass C and past the lower edge of the apron D.

It is a matter of course that the section C can also be protected against wind and rain both from the top and the sides. The driver can also be protected from all sides in connection with the arrangements of the invention by means well known in the trade.

It is obvious, that it is not necessary in any case to apply the invention on the whole width of the screen.

It will be understood that the details of the invention may be varied in many ways within the ambit of the claims without departing from the spirit of the invention or sacrificing any of its advantages.

What I claim as my invention and desire to secure by United States Letters Patent is:

1. In a wind screen for motor vehicles, the combination of an outer glass screen hinged along its upper edge to the roof, with an inner screen attached at one end only to a pair of stayrods connecting the roof with the body of the vehicle, said inner screen consisting of three hinged sections, the sections being capable of extensible movement one beyond the other, the uppermost of which consists of glass.

2. In a wind screen for motor vehicles, the combination of an outer glass screen hinged along its upper edge to the roof, with an inner screen attached to a pair of stayrods connecting the roof with the body of the vehicle, said inner screen consisting of three hinged sections, the uppermost of which consists of glass, and being adapted to be lowered by the height of the lowest section.

3. In a wind screen for motor vehicles, the combination of an outer glass screen hinged along its upper edge to the roof, with an inner screen attached to a pair of stayrods connecting the roof with the body of the vehicle, said inner screen consisting of three hinged sections, the uppermost of which is comparatively narrow and consists of glass, and being adapted to be lowered along the body of the vehicle by the height of the lowest section.

4. In a wind screen for motor vehicles, the combination of an outer glass screen hinged along its upper edge to the roof, with an inner screen attached to a pair of stayrods connecting the roof with the body of the vehicle, said inner screen resting with its bottom edge upon the vehicle body and consisting of three hinged sections adapted to be folded together and the uppermost of which is comparatively narrow and consists of glass.

In testimony whereof I affix my signature.

RICHARD BRANDTS.